(12) United States Patent
Arguelles et al.

(10) Patent No.: US 8,458,067 B2
(45) Date of Patent: Jun. 4, 2013

(54) SYSTEM AND METHOD FOR EMERGENCY TRACKING

(75) Inventors: Shelley Arguelles, Houston, TX (US); Dave Babcock, Cave Creek, AZ (US); Stacey Edwards, Cherry Hill, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 488 days.

(21) Appl. No.: 12/580,060

(22) Filed: Oct. 15, 2009

(65) Prior Publication Data

US 2010/0057502 A1 Mar. 4, 2010

Related U.S. Application Data

(63) Continuation-in-part of application No. 10/608,764, filed on Jun. 27, 2003, now Pat. No. 7,647,257.

(60) Provisional application No. 60/468,495, filed on May 6, 2003.

(51) Int. Cl.
*G06Q 40/00* (2012.01)

(52) U.S. Cl.
USPC ............................................. 705/35; 705/325

(58) Field of Classification Search
USPC ...................................................... 705/35–45
See application file for complete search history.

(56) References Cited

U.S. PATENT DOCUMENTS

| | | | |
|---|---|---|---|
| 5,189,608 A | 2/1993 | Lyons et al. | |
| 5,255,184 A | 10/1993 | Hornick et al. | |
| 5,477,040 A | 12/1995 | Lalonde | |
| 5,521,363 A | 5/1996 | Tannenbaum | |
| 5,570,283 A * | 10/1996 | Shoolery et al. | 705/5 |
| 5,638,519 A | 6/1997 | Haluska | |
| 5,649,115 A | 7/1997 | Schrader | |
| 5,699,528 A | 12/1997 | Hogan | |
| 5,704,044 A | 12/1997 | Tarter | |
| 5,710,889 A | 1/1998 | Clark et al. | |
| 5,740,271 A | 4/1998 | Kumkler | |
| 5,787,403 A | 7/1998 | Randle | |
| 5,832,451 A | 11/1998 | Flake | |
| 5,832,460 A | 11/1998 | Bednar | |
| 5,842,185 A | 11/1998 | Chancey et al. | |
| 5,852,812 A | 12/1998 | Reeder | |
| 5,859,419 A | 1/1999 | Wynn | |
| 5,890,140 A | 3/1999 | Clark et al. | |

(Continued)

OTHER PUBLICATIONS

Supplemental Notice of Allowance mailed Nov. 9, 2009 in U.S. Appl. No. 10/608,764.

(Continued)

*Primary Examiner* — Thomas M Hammond, III

(74) *Attorney, Agent, or Firm* — Snell & Wilmer L.L.P.

(57) ABSTRACT

An emergency tracking system and method is disclosed that determines location information of individuals based upon travel information and financial transaction information, receives crisis information related to a crisis and determines a subset of individuals potentially impacted by the crisis based on the location information. The system may also notify a third party regarding the subset of individuals and send message to the subset of individuals, wherein the message includes alternative arrangements to at least one of minimize or avoid the crisis. The system also allows an employer to enter search criteria to locate certain types of employees and view such employees on a graphical display of a map.

19 Claims, 7 Drawing Sheets

U.S. PATENT DOCUMENTS

| | | | |
|---|---|---|---|
| 5,903,881 | A | 5/1999 | Schrader et al. |
| 5,948,040 | A | 9/1999 | DeLorme |
| 5,963,925 | A | 10/1999 | Kolling |
| 6,009,408 | A * | 12/1999 | Buchanan .................. 705/5 |
| 6,012,050 | A | 1/2000 | Eaton et al. |
| 6,029,144 | A | 2/2000 | Barrett |
| 6,047,268 | A | 4/2000 | Bartoli et al. |
| 6,047,269 | A | 4/2000 | Biffar |
| 6,068,194 | A | 5/2000 | Mazur |
| 6,072,870 | A | 6/2000 | Nguyen |
| 6,078,907 | A | 6/2000 | Lamm |
| 6,115,458 | A | 9/2000 | Taskett |
| 6,119,105 | A | 9/2000 | Williams |
| 6,128,602 | A | 10/2000 | Northington et al. |
| 6,128,603 | A | 10/2000 | Dent et al. |
| 6,154,729 | A | 11/2000 | Cannon et al. |
| 6,178,409 | B1 | 1/2001 | Weber |
| 6,185,542 | B1 | 2/2001 | Moran et al. |
| 6,185,544 | B1 | 2/2001 | Sakamoto et al. |
| 6,202,054 | B1 | 3/2001 | Lawlor et al. |
| 6,285,991 | B1 | 9/2001 | Powar |
| 6,292,789 | B1 | 9/2001 | Schutzer |
| 6,304,857 | B1 | 10/2001 | Heindel et al. |
| 6,343,279 | B1 | 1/2002 | Bissonette et al. |
| 6,345,261 | B1 | 2/2002 | Feidelson et al. |
| 6,351,739 | B1 | 2/2002 | Egendorf |
| 6,385,595 | B1 | 5/2002 | Kolling et al. |
| 6,442,526 | B1 | 8/2002 | Vance et al. |
| 6,446,048 | B1 | 9/2002 | Wells et al. |
| 6,493,685 | B1 | 12/2002 | Ensel et al. |
| 6,609,658 | B1 | 8/2003 | Sehr |
| 6,704,039 | B2 | 3/2004 | Pena |
| 6,959,339 | B1 * | 10/2005 | Wu et al. .................. 709/246 |
| 7,353,208 | B1 | 4/2008 | Stambaugh |
| 7,383,218 | B1 | 6/2008 | Oros |
| 2001/0047336 | A1 | 11/2001 | Maycock, Jr. et al. |
| 2001/0056387 | A1 | 12/2001 | Magary et al. |
| 2002/0026416 | A1 | 2/2002 | Provinse |
| 2002/0069122 | A1 | 6/2002 | Yun et al. |
| 2002/0087410 | A1 | 7/2002 | Walker et al. |
| 2002/0099635 | A1 | 7/2002 | Guiragosian |
| 2002/0123948 | A1 | 9/2002 | Yumoto |
| 2002/0133605 | A1 | 9/2002 | Khanna et al. |
| 2002/0138343 | A1 | 9/2002 | Weatherford et al. |
| 2002/0194127 | A1 | 12/2002 | Randell et al. |
| 2003/0023524 | A1 | 1/2003 | Sugimoto et al. |
| 2003/0023550 | A1 | 1/2003 | Lee |
| 2003/0040987 | A1 | 2/2003 | Hudson |
| 2003/0061132 | A1 | 3/2003 | Yu, Sr. et al. |
| 2003/0088487 | A1 | 5/2003 | Cheng |
| 2003/0097331 | A1 | 5/2003 | Cohen |
| 2003/0120526 | A1 | 6/2003 | Altman |
| 2003/0144956 | A1 | 7/2003 | Yu, Jr. et al. |
| 2003/0191711 | A1 | 10/2003 | Jamison et al. |
| 2003/0225690 | A1 | 12/2003 | Eaton |
| 2003/0229588 | A1 | 12/2003 | Falk et al. |
| 2004/0002876 | A1 | 1/2004 | Sommers |
| 2004/0019560 | A1 | 1/2004 | Evans |
| 2004/0054626 | A1 | 3/2004 | Fuentes |
| 2005/0289025 | A1 | 12/2005 | Fredericks et al. |
| 2008/0201291 | A1 * | 8/2008 | Fussner et al. .................. 707/1 |
| 2008/0319808 | A1 | 12/2008 | Wofford et al. |
| 2009/0313053 | A1 | 12/2009 | Gengarella et al. |
| 2009/0322560 | A1 * | 12/2009 | Tengler et al. ............. 340/905 |
| 2012/0072521 | A1 * | 3/2012 | Goodman et al. .......... 709/206 |

OTHER PUBLICATIONS

Supplemental Notice of Allowance mailed Nov. 25, 2009 in U.S. Appl. No. 10/608,764.
Non-Final Office Action dated Jul. 9, 2007 in U.S. Appl. No. 10/608,764.
Final Office Action dated Nov. 21, 2007 in U.S. Appl. No. 10/608,764.
Advisory Action dated Feb. 8, 2008 in U.S. Appl. No. 10/608,764.
Non-Final Office Action dated Apr. 17, 2008 in U.S. Appl. No. 10/608,764.
Final Office Action dated Oct. 20, 2008 in U.S. Appl. No. 10/608,764.
Advisory Action dated Dec. 26, 2008 in U.S. Appl. No. 10/608,764.
Non-Final Office Action dated Apr. 13, 2009 in U.S. Appl. No. 10/608,764.
Notice of Allowance dated Sep. 28, 2009 in U.S. Appl. No. 10/608,764.
PCT; International Search Report dated Apr. 6, 2005 in Application No. PCT/2004/007856.
PCT; Written Opinion dated Apr. 6, 2005 in Application No. PCT/2004/007856.
PCT; International PreliminaryReport on Patentability dated Jul. 20, 2005 in Application No. PCT/2004/007856.
USPTO; Final Office Action dated Mar. 24, 2011 in U.S. Appl. No. 11/689,958.
USPTO; Advisory Action dated May 26, 2011 in U.S. Appl. No. 11/689,958.
USPTO; Office Action dated May 12, 2011 in U.S. Appl. No. 11/551,778.
USPTO; Office Action dated Jul. 15, 2010 in U.S. Appl. No. 11/689,958.
USPTO; Advisory Action dated Mar. 17, 2011 in U.S. Appl. No. 11/551,778.
USPTO; Final Office Action dated Jan. 6, 2011 in U.S. Appl. No. 11/551,778.
USPTO; Office Action dated Sep. 16, 2010 in U.S. Appl. No. 11/551,778.
USPTO; Final Office Action dated Oct. 11, 2011 in U.S. Appl. No. 11/551,778.
USPTO; Advisory Action dated Dec. 22, 2011 in U.S. Appl. No. 11/551,778.

* cited by examiner

Home | Personal | Small Business | Merchants | Corporations

Customer Service | Site Directory

Do you already have a User ID and Password?

Yes    I have a User ID and Password
Enter User ID & Password
User ID
Password    [Go]

Forgot your Password?
I'm registering for a new service and want a separate ID and Password

[<< Back]   (NEED HELP ?)

No    I need to create a User ID and Password
I am a new user   [Go]

View Corporate Entities and Important Disclosures, Web Site Rules and Regulations, Trademarks, and Privacy Statement. Copyright © 2000 American Express Company. All Rights Reserved. Users of this site agree to be bound by the terms of the American Express Web Site Rules and Regulations.

← Back → - ☒ ⟳

| Home | Personal | Small Business | Corporate |

● Customer Service ● Site Directory ● About the Company ● My American Express

Corporate Card and Corporate Purchasing Card          SHARED REPORTS | MY REPORTS | CREATE REPORTS | HISTORY LIST | PREFERENCES Quick search [    ] (Go)    You are here: Shared Reports > Program management – Detail > Address Listing
advanced...

(LOGOUT)
• Entrance Page
▼ SUBSCRIBE REPORTS

You do not have any subscriptions.

▶ NEED HELP?

Address Listing

▲ Properties ▶ Drill / ▼ Filter Details ▶ Filter on Selections
Cardmember Status = ACTIVE ACCOUNT or CANCELLED ACCOUNT
And
Client Organization = CPC DEMO , CPCDEMO1 , REXPORT1

| Cntl. Acct Name | Cntl. Acct. No. | Cntl. Acct. Owner | Cardmember Acct No. | Last Name | First Name | MJ | City | State | ZIP | Cost Center | Add |
|---|---|---|---|---|---|---|---|---|---|---|---|
| REXPORT1 | 2464-283215-90330 | NICK XENG | 2464-208555-70337 | ABBOTT | JANE | J | BOCA RATON | FL | 33433 | 96515 | 490 AVE |
| REXPORT1 | 2464-283215-90330 | NICK XENG | 2464-257385-20336 | ABBOTT | JOE | A | BOCA RATON | FL | 33433 | 96609 | 466 AVE |
| REXPORT1 | 2464-283215-90330 | NICK XENG | 2464-261875-20330 | ABBOTT | PETE | J | | FL | 33433 | 96683 | 476 AVE |
| REXPORT1 | 2464-283215-90330 | NICK XENG | 2464-223665-10339 | ABBOTT | V | | BOCA RATON | FL | 33433 | 96090 | 490 AVE |
| REXPORT1 | 2464-283215-90330 | NICK XENG | 2464-210115-80330 | ABBOTT | WILL | | BOCA RATON | FL | 33433 | 96602 | 437 AVE |
| REXPORT1 | 2464- | NICK | 2464- | ABBOTT | E | T | BOSTON | MA | 02205 | 96967 | 840 |

Start

SYSTEM AND METHOD FOR EMERGENCY TRACKING

REFERENCE TO RELATED APPLICATION

This application is a continuation-in-part of, and claims priority to, U.S. Ser. No. 10/608,764 filed Jun. 27, 2003 and entitled "System and Method for Web Access to Financial Data." The '764 application claims priority to U.S. Provisional Patent Application Ser. No. 60/468,495, filed on May 6, 2003. The entire contents of all of these documents are incorporated herein by reference.

FIELD OF INVENTION

The present invention generally relates to emergency tracking of individuals, and more particularly, to a system and method for locating individuals using both travel information and financial transaction information.

BACKGROUND OF THE INVENTION

Previous options for clients to view and receive certain reports (e.g., Management Information Reports) were to, for example, receive the reports on paper each month, receive the reports as a data file, or receive data on diskette and/or a CD which was loaded into PC based applications for viewing and reporting. However, these delivery mechanisms were slow (in some cases 90-days after the close of a quarter) and costly. As such, a need existed for an on-line capability to replace or enhance the distribution options. However, available on-line tools, for example, were not able to be sufficiently developed because of the complexity of data capture and conditioning from multiple sources, the excessive volume of transaction level detail needed to provide the full functionality required and the lack of technology options to create solutions.

Reports also exist that relate to a traveler's itinerary. A traveler's itinerary usually includes intended travel information which may be obtained from a travel database (e.g., Customer Reservation System or CRS). However, a portion or all of such travel itineraries are often changed or cancelled. As such, a need exists to obtain additional data to go beyond intended travel plans, and instead, more accurately know the actual activities or location of a consumer.

SUMMARY OF THE INVENTION

In various embodiments, the emergency tracking system and method determines location information of individuals based upon travel information and financial transaction information. The system receives crisis information related to a crisis and determines a subset of individuals potentially impacted by the crisis based on the location information. The system may also notify a third party regarding the subset of individuals and send message to the subset of individuals, wherein the message includes alternative arrangements to at least one of minimize or avoid the crisis. The system also allows an employer to enter search criteria to locate certain types of employees and view such employees on a graphical display of a map. Upon locating the employee in a crisis location or potentially impacted by a crisis situation, the employer is able to provide risk management information, support and service.

BRIEF DESCRIPTION OF THE DRAWINGS

The accompanying drawings, wherein like reference numerals represent like elements, are incorporated in and constitute a part of this specification and, together with the description, explain the advantages and principles of the invention. In the drawings.

FIG. 6 is a diagram illustrating an example of a web page for a user to log into the system;

FIG. 7 is a diagram illustrating an example of a detailed web page for submitting an on-line request for account data; and FIG. 8 is a diagram illustrating an example of a web page for providing on-line account data.

DETAILED DESCRIPTION

Figure 1:
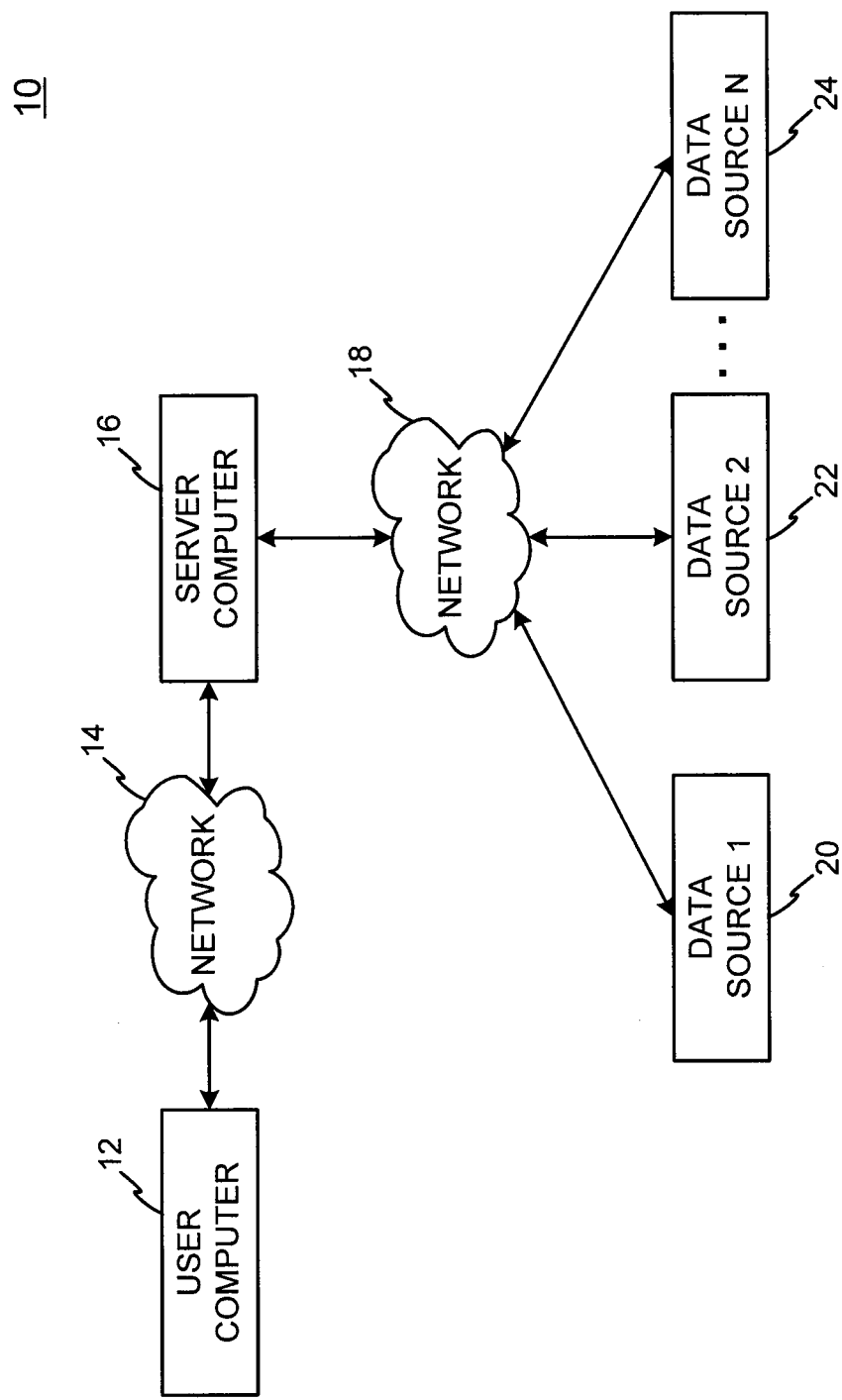
FIG. 1 is a schematic diagram of an exemplary system for providing on-line account data.

Exemplary embodiments include a web application that enables access to a client's specific account transaction detail for the purposes of, for example, vendor negotiation and card program management. The charge transaction detail includes, for example, travel transaction detail, corporate card detail, loyalty information detail and corporate purchasing card detail. In one embodiment, the transaction detail is global in nature (e.g., data captured from all regional systems) and can include third party data regarding both card and travel, as well as reference data which can be purchased from multiple industry vendor sources. The term "charge card" is intended to include credit cards, debit cards, stored value cards, and non-card based financial instruments.

The web application and web page access that clients use to access the data and create report views of the information can be implemented with, for example, a third party software package from a company called MicroStrategy. The product enables clients to manage their corporate program with a host as the card provider, along with their own travel management performance and policies. In addition, the product enables the clients to negotiate purchase opportunities with key vendors (airlines, hotels etc).

The system can also include a "create a report capability" which allows users to add filters and data elements to an existing report format and create a report specific to their needs and data. The system includes access for the clients to individual market level detail, along with LAC, EMEA, and JAPA (Latin America/Caribbean, Europe, Middle East, Africa, and Japan, Asia, Pacific, Australia) transaction detail. The system also allows report generation wherein the reports include LID (line item detail) data from the clients' Corporate Purchase Card (CPC) purchases, thereby allowing the user to view specific detailed transactions from their selected vendors. This feature includes full hierarchy information and enhanced reporting capabilities. The system also includes Corporate Purchasing card data in its warehouse, which allows clients to view their total program with the host. It also allows clients to combine the data sets and have a single report generated on both CPC and Card spend. The functionality and access allows faster delivery of information to clients which results in, for example, increased client loyalty.

In an exemplary embodiment, the web application eliminates or reduces the need for any 'helper' applications on the web browser, provides a more scalable application and allows clients to access certain data and create report views of the information. Removal of the 'helper apps' (e.g., Active-X or Java Applets), in one embodiment, allows greater market penetration since these applications have been shown in some instances to be security risks. The invention also eliminates the need for a separate security log-in function and allows implementation of a single sign-on capability. As such, clients can log into a single portal and are automatically logged into applications within the portal without having to re-authenticate.

A product implementing an exemplary embodiment is a combination of function, features, data and support service. More particularly, in one embodiment, the product is accessed via a web site which is specifically focused on corporate accounts, the program administrator and the corporate card member. The database is a combination of charge card information (transactions) from every region and country that the host operates as a wholly owned organization or as a franchise or partnership. The collection, consolidation, data management and conditioning of that data are unique in several areas. The database adds and conditions data with proprietary information relating to the host supplier network. This allows the clients using the product to view and report on their corporate spend in key categories (e.g., industries). The data conditioning process for the database captures and consolidates multiple data sources from industry providers. There are also multiple airline data feeds and computerized reservation system (CRS) data feeds providing additional enriched data such as air sectors (travel itinerary) fare basis codes, etc. Many of these data feeds can be purchased by the host on behalf of the client and the data is integrated with their account data.

The client can report on this data in multiple views, either an individual country, a region, or on a global basis. The reporting functionality is also a combination of unique products and services. The tool provides a single sign on capability which allows the client to sign on once at the central web site and then access multiple services and functions, wherein one of these functions is the enhanced reporting capability. The client has the ability to view their spend via a web browser while no software is required to be loaded on the client PC. The clients have access to a set of standard reports or have the ability to develop a view of the data (report) that they request and create on-line. The reports can be viewed on-line, printed or exported into other software formats such as Excel at the client site. The charge card information is provided in, for example, two forms such as billed and unbilled; and the client can view either through the reporting tool. Additionally, the client can view their Corporate Purchase Card data and their Corporate Card charges as separate sets of data or on a combined report.

Examples of problems solved with this product:
A person who is responsible for supplier management and vendor negotiations can ask, 'What was the total number of transactions and spend my company put on American Express Corporate Cards on all flights between Rome and Sydney? I want to compare 1Q 2003 to 1Q 2002 for Virgin Atlantic and British Airways.'
A person managing a cost center can ask, 'Where have my folks used their American Express Cards over the past month?'

FIG. 1 is a schematic diagram of a system 10 for providing on-line account data. In system 10, a user at a user computer 12 can submit an on-line request to a server computer 16, via a network 14, for charge card transaction details. Server computer 16, via a network 18, can access multiple data sources 20, 22, and 24 to obtain the charge card transaction detail for the user. Once it obtains the data, server computer 16 can condition the data, as it often will be retrieved from multiple disparate sources (including any combination of internal or external data sources), and format the data into a report. Server computer 16 can then send the report to user computer 12 via network 14 in, for example, a web page or other format. Networks 14 and 18 can include any wireline or wireless network for data communication. The communication across the network may be achieved using web services technology, including but not limited to Simple Object Access Protocol (SOAP), Web Services Description Language (WSDL), or Universal Description, Discovery and Integration (UDDI). Three data sources are shown for illustrative purposes only; embodiments can include more or fewer data sources depending upon a particular implementation. The data sources 20, 22, and 24 represent any source of data such as, a local or remote memory or database, possibly in conjunction with an associated computer.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Figure 2:
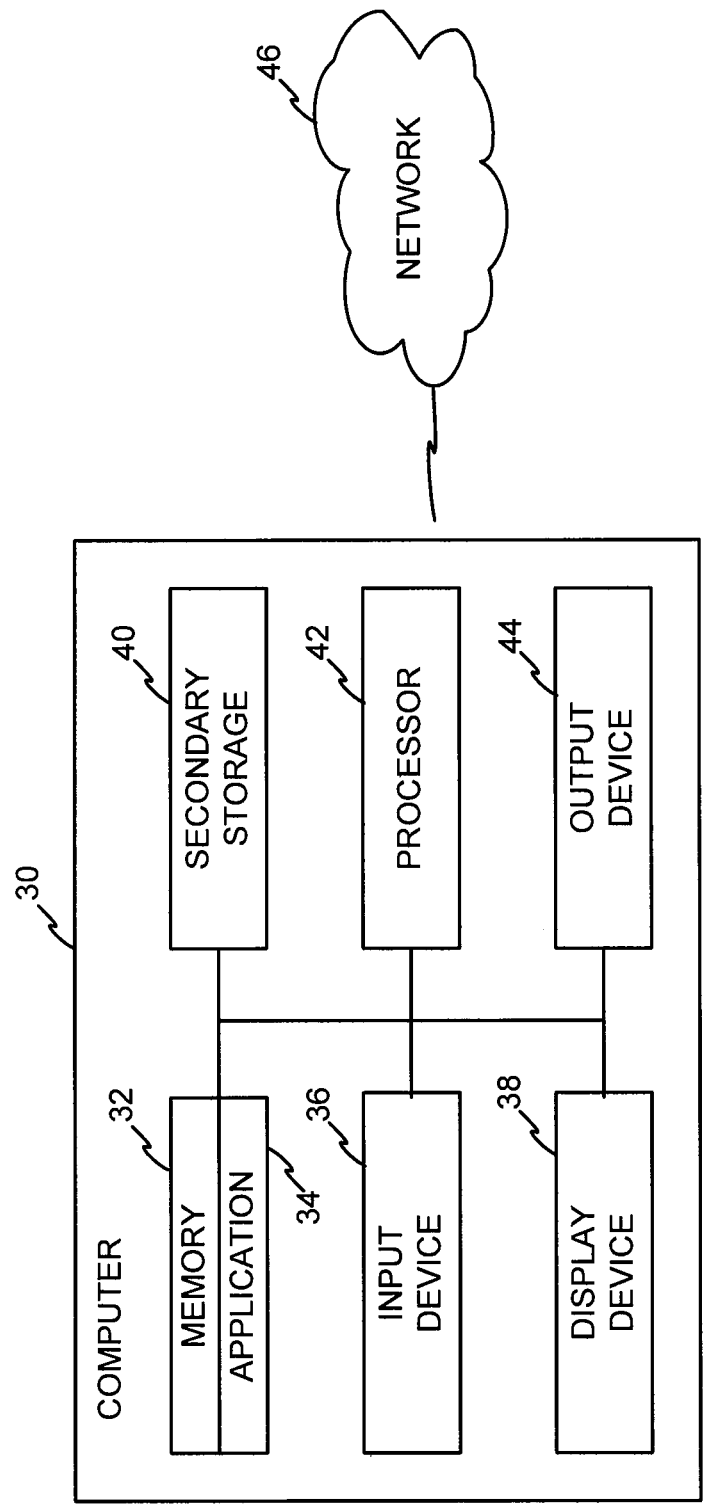
FIG. 2 is a schematic diagram of exemplary components of computers and servers used in the system.

FIG. 2 is a schematic diagram of an exemplary computer 30 illustrating typical components of the computers and server shown in FIG. 1 for the system. Computer 30 may include a connection with a network 46 such as the Internet or communications networks through any suitable network connection using, for example, TCP/IP for data transmission. Computer 30 typically includes a memory 32, a secondary storage device 40, a processor 42, an input device 36 for entering information into computer 30, a display device 38 for providing a visual display of information, and an output device 44 for outputting information such as in hard copy or audio form.

Memory 32 may include random access memory (RAM) or similar types of memory, and it may store one or more applications 34 for execution by processor 42. Applications 34 may include programming to perform the methods discussed herein.

Secondary storage device 40 may include any hardware and/or software for storing data such as, for example, a hard disk drive, floppy disk drive, CD-ROM drive, or other types of non-volatile data storage. Processor 42 may execute applications or programs stored in memory 32 or secondary storage 40, or received from the Internet or other network 46. Although computer 30 is depicted with various components, one skilled in the art will appreciate that the computer may contain different components.

Computer 30 may include local or remote databases for storing and retrieving information for processing transactions. Any databases discussed herein may be any type of database, such as relational, graphical, hierarchical, object-oriented, and/or the like. Common database products that may be used to implement the databases include UDB by IBM (White Plains, N.Y.), any of the database products available from Oracle Corporation (Redwood Shores, Calif.), Microsoft Access or MSSQL by Microsoft Corporation (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The system, as shown in FIG. 1, may include a host server or other computing systems including a processor for processing digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including client data, merchant data, financial institution data and/or like data that may be used in association with the present invention. As those skilled in the art may appreciate, user computer may typically include an operating system (e.g., Windows NT, 95/98/2000, Linux, Solaris, etc.) as well as various conventional support software and drivers typically associated with computers. User computer may be in a home or business environment with access to a network. In an exemplary embodiment, access is through the Internet through a commercially-available web-browser software package.

Communication between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art may also appreciate that, for security reasons, any databases, systems, or components of the present invention may include any combination of databases or components at a single location or at multiple locations, wherein each database or system includes any of various suitable security features, such as firewalls, access codes, encryption, decryption, and/or the like.

The computers discussed herein may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system.

Figure 3:
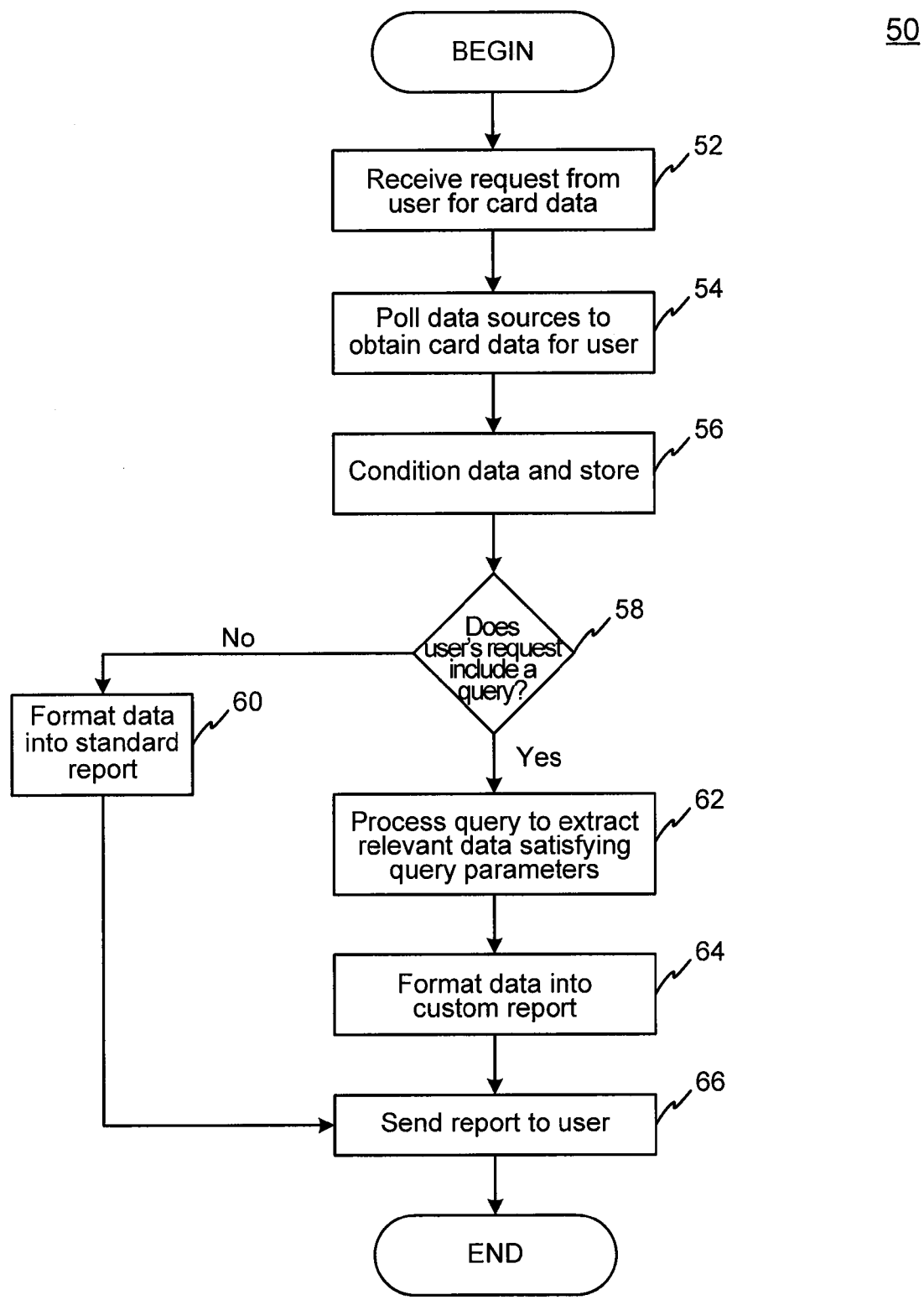
FIG. 3 is a flow chart of an exemplary method to provide on-line account data.

FIG. 3 is a flow chart of an exemplary method 50 to provide on-line account data, which may include card data. Method 50 may be implemented in, for example, software modules for execution by user computer 12 and server computer 16. Although the steps of method 50 are shown in a particular order, they may alternatively be executed in other orders and more steps may be added or steps removed, if necessary or desired.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flow chart illustrations of methods, apparatus (e.g., systems), and computer program products according to various aspects of the invention. It may be understood that each functional block of the block diagrams and the flow chart illustrations, and combinations of functional blocks in the block diagrams and flow chart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flow chart block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flow chart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow chart block or blocks.

Accordingly, functional blocks of the block diagrams and flow chart illustrations support combinations of means for performing the specified functions, combinations of steps for performing the specified functions, and program instruction means for performing the specified functions. It may also be understood that each functional block of the block diagrams and flow chart illustrations, and combinations of functional blocks in the block diagrams and flow chart illustrations, may be implemented by either special purpose hardware-based computer systems which perform the specified functions or steps, or suitable combinations of special purpose hardware and computer instructions.

In method 50, server computer 16 receives a request from a user at user computer 12 for account data (step 52). The "account data" can include any data related to transactions involving credit cards, charge cards, or other financial cards. User computer 12 may include, for example, a software application to help facilitate the user's communication with server computer 16. The request may be received from a user or other person, for example, at the requesting entity. As used herein, the term "end user", "consumer", "customer", "supplier", "cardmember", "business" or "merchant" may be used interchangeably with each other, and each shall mean any person, entity, machine, hardware, software or business. The card issuing institutions may include credit card companies, card sponsoring companies, or third party issuers under contract with financial institutions. It is further noted that other participants may be involved in some phases of the transaction, such as an intermediary settlement institution, but these participants are not shown.

Figure 4:
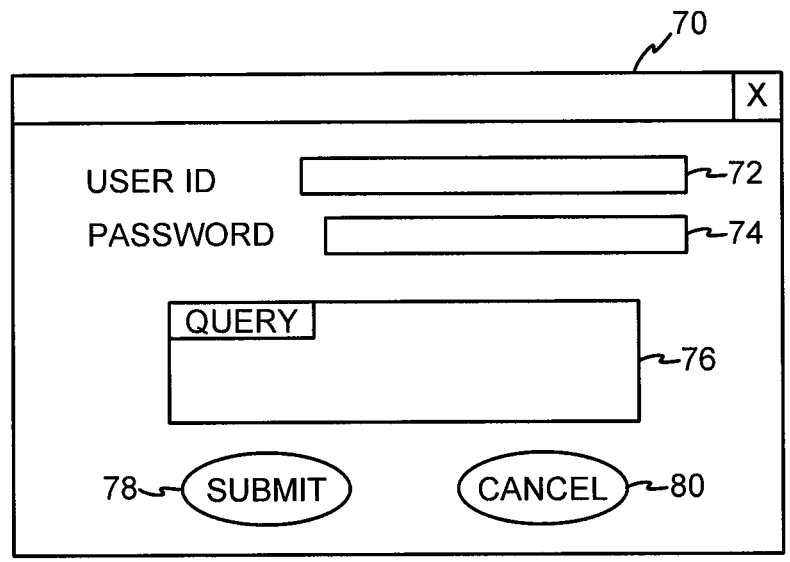
FIG. 4 is a diagram of an exemplary web page for submitting an on-line request for account data.
Figure 7:
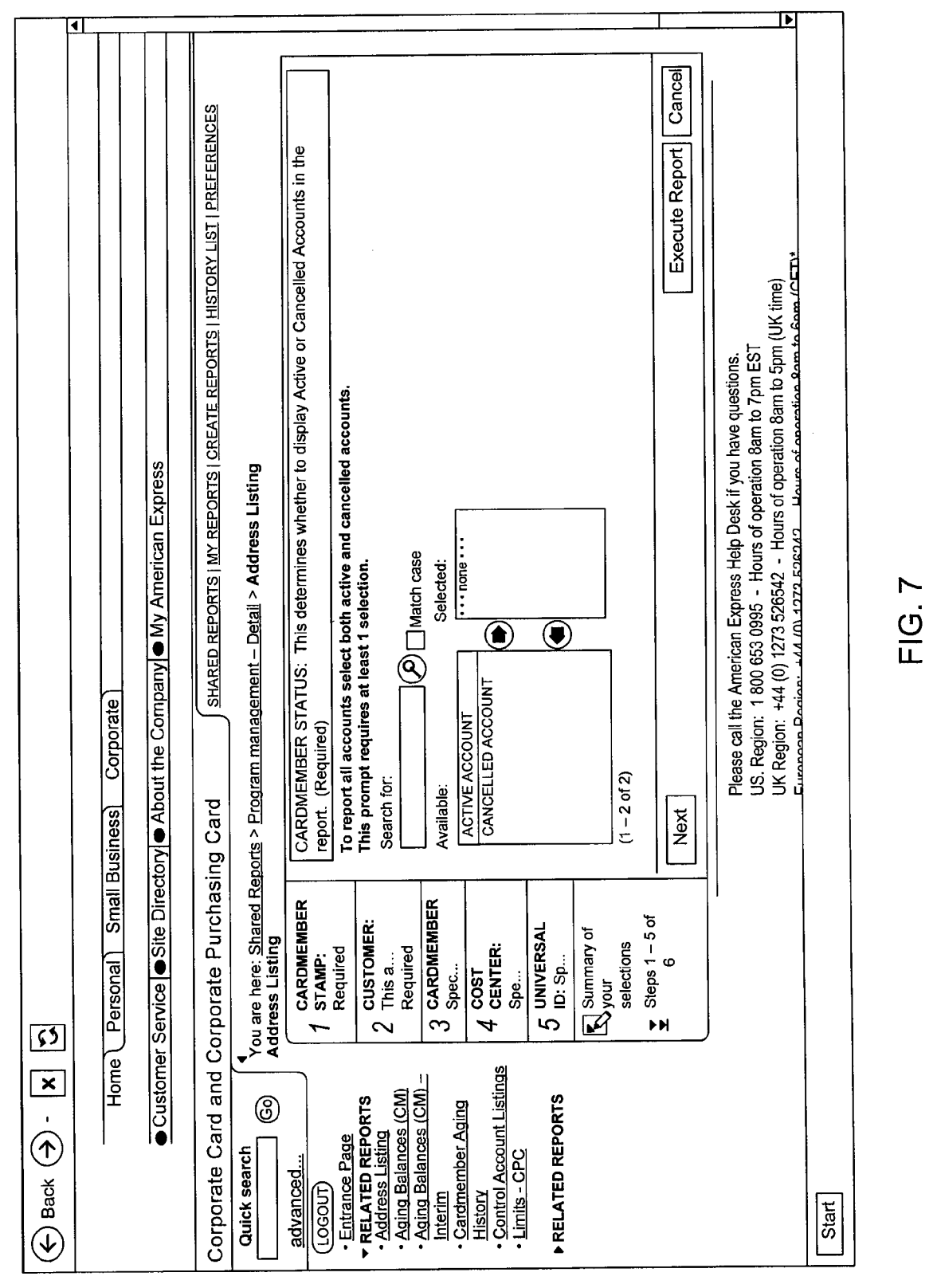

FIG. 4 is a diagram of an exemplary screen 70 for a user to enter a request for account data and submit it to server computer 16. FIGS. 6 and 7 illustrate examples of more detailed screens for a user to log into the system and submit an on-line request for account data.

Screen 70 can be implemented in, for example, a web page for network transmission. The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like. A server may include a webservice which receives a request from a browser which includes a URL and an IP address (e.g., 127.0.0.1). The webservice retrieves the appropriate web pages and sends the web pages to the IP address.

In screen 70, a user can enter a user name or other identifier in a section 72 and a password in a section 74. A section 76 allows a user to enter a particular query, which can include a request for account data within certain parameters, examples of which are provided above. The user can select a section 78 to submit the request or select a section 80 to cancel the request.

The request may optionally include an account number. An "account number", as used herein, may include any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

After receiving the request, server computer 16 polls or otherwise contacts data sources 20, 22, and 24 to obtain the account data for the user's request (step 54). Server computer 16 conditions the data and can store it (step 56). Server computer 16 can use, for example, metadata in order to determine how to locate and retrieve the account data. In particular, a relationship can be defined between the query (request) attributes and metrics, and target data sources to assure the integrity of the account data report returned to the user.

Server computer 16 also determines if the user's request includes a query, as represented in section 76 of screen 70 (step 58). If the request does not include a query, server computer 16 can format the conditioned data into a standard or default report (step 60).

If the request included a query (step 58), server computer 16 processes the query to extract the relevant data satisfying the query parameters (step 62). A query, as submitted by a user, can include a request for account data satisfying certain parameters. Processing the query can include parsing the natural language submitted query to generate search parameters. Those parameters can be used to obtain the relevant data using, for example, the metadata. Server computer 16 can format the extracted data into a custom report (step 64). Once the report is compiled and formatted, server computer 16 can send the standard or custom report to user computer 12 via network 14 (step 66).

Figure 5:
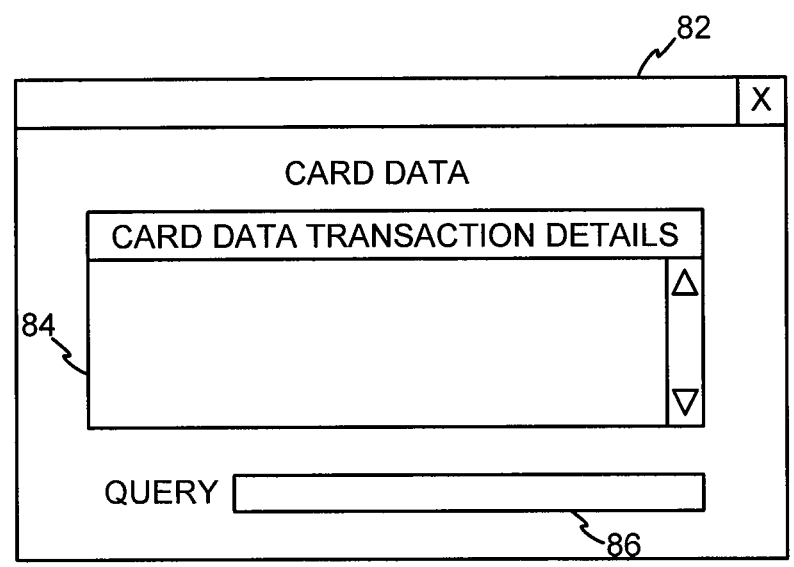
FIG. 5 is a diagram of an exemplary web page for providing on-line account data.

FIG. 5 is a diagram of an exemplary screen 82 for providing on-line account data. FIG. 8 illustrates an example of a more detailed screen for providing on-line account data. Screen 82 can be implemented, for example, in a web page for network transmission. Screen 82 can include a section 84 for providing the report details and can optionally include a section 86 to repeat the user's query, if one was submitted.

The systems and methods discussed herein may also be incorporated into a system and method used to help identify and/or locate certain individuals or groups. Corporate travel managers and security officers have increasing responsibility to protect their employees from risks and crisis (e.g., political unrest, terrorism, natural catastrophes, etc), while the employees are, for example, traveling on business trips. Knowing the location of the employees may help with that task before, during and/or after the crisis. The system may allow an employer to anticipate threats with 24×7 event intelligence. The system also lowers operating costs by expediting the time to locate an employee, and thereby reducing resources needed to answer questions from employers and families, during time of crisis. While the system and method may be discussed with respect to employers and employees, identifying and/or locating any individuals or groups by any individuals or groups is contemplated.

The system provides additional confidence to consumers that, if a crisis occurs, the traveler will be located and assisted. Upon locating the employee in a crisis location or potentially impacted by a crisis situation, the employer is able to provide risk management information, support and service. For example, if an earthquake occurs near an employee/traveler's hotel, the system notifies the employer that the traveler is at risk. The system may also cross-reference charge card and travel related transactions to determine the time and place of the traveler's last purchase.

The system can also tailor such traveler information to the traveler's needs, then deliver targeted business intelligence. For example, the system may maintain or acquire (e.g., in real time) travel profile data which contains employee IDs, names of travel companions (e.g., family members or work colleagues), destinations, account numbers, e-mail addresses, passport information, preferred rewards programs, and emergency contact information. If the traveler is scheduled to pass through the Houston air hub during a hurricane, the system may (or notify other systems to) reroute the traveler onto a preferred airline. Similarly, if the consumer is ticketed on a train that crashes, the employer can e-mail the employee to determine the employee's medical condition, notify family, and/or arrange for third party medical providers to evacuate the traveler from the country.

While travel itineraries may be helpful regarding intended activities, combining travel data with transaction data allows the system to better verify the true actions and locations of the consumer. For example, a consumer itinerary may show that the consumer is due to travel from Phoenix to New York on Wednesday afternoon; however, the transaction data may show that the consumer incurred a $200 change ticket fee on Wednesday, along with a restaurant transaction in Chicago on Wednesday night. The system may then conclude that the consumer most likely changed her flight and boarded a flight to Chicago, instead of New York.

The employer may also desire to know the location of employees for various other reasons, such as, for example, to confirm the employee is following company guidelines, the employee is appropriately spending company funds, various sales representatives are appropriately distributed throughout a region, the employee is attending certain functions, the employee is not working outside of her territory, the employee is not near undesirable people or groups, etc. Parents, spouses and groups may also desire to identify or locate certain individuals or groups for similar or other reasons (e.g., husband with a restraining order is not near an ex-wife or near kids).

The system may accomplish such tasks by utilizing travel information and transaction information to obtain more comprehensive and useful information. The travel information may include, for example, computer reservation system (CRS) data, itinerary data, traveler profile, airline ticketing data, car rental data, hotel data, record locator, passenger name, flight number, flight carrier code, flight type (e.g., air, rail), origination airport, depart date of trip, depart time of trip, destination airport, arrival date of trip, arrival time of trip, traveler email address, hotel chain code, hotel name, hotel address, hotel city, hotel state, hotel zip code, hotel country, hotel phone number, city code of airport, hotel check-in date, hotel check-out date, car domestic and international indicator, car vendor code, car vendor name, car pickup city code, car pickup city name, car pickup date and time, car drop-off date and time, statement information, car domestic and international indicator, user defined field, traveler cell or mobile phone number, traveler home phone number, traveler misc phone number, traveler agency phone number, travelers fax number, and/or identifier if passenger name record is ticketed. The system may also cross-reference such data with local weather, visa requirements, health updates, suggested inoculations, etc.

The transaction information may include, for example, charge account, debit account, corporate account, bank accounts, credit card accounts, card member details (name, card number), approval or decline code, authorization date, authorization time, authorization type code, average request amount for previous 12 months, base account id, basic supplementary number, billing decline amount, billing currency code, billing decline amount in us dollars, date when the transaction was declined at the se, decline reason code, sequence number uniquely identifying each transaction on a given day, exposure amount in us dollars, currency code in iso, number of times the limit exceeded in a period, limit id, load timestamp, last updated timestamp, last updated user identifier, maximum requested amount for previous 12 months, priority number for the reason of decline, proposed limit amount for the previous 12 months, report period identifier, service establishment number, dba name, legal name, city name, street address, service establishment types, shops, hotels, restaurants, travel, check cashing, sight draft, check cashing, international, oil companies, department stores, mail order, cash dispensing, travelers cheque dispensing, and/or car-rental. For example, the transaction information may locate consumers via restaurant transactions, taxi/limousine transactions, gasoline purchases, etc. The system may also utilize loyalty account data (e.g., loyalty cards), gift card data, calling account data (e.g., phone cards), club account data (e.g., Costco cards), entertainment account data (e.g., sporting event tickets, concert tickets, night club memberships, etc), transportation data (e.g., subway cards, tollway expresspass, etc), and/or personal digital assistant data (e.g., cell phones, iPhone, Blackberry, etc).

A corporation may provide its employees with corporate accounts, travel agents or travel booking systems, such that thousands of daily transaction card transactions and travel transactions exist each day. The transaction account data may include account data (e.g., "swiped" card data) which may be acquired in real-time with each authorization request or purchase. Such transaction data may be periodically collected and stored (e.g., once per day), and the specific time such information is acquired may vary depending on the location and market. The travel feeds may be updated or acquired periodically (e.g., every 15 minutes). The system categorizes such transactions (e.g., based on characteristics that are most useful or interesting to the employer), matches certain of the transactions to a crisis location (e.g., via profile information, merchant data, etc.), and cross-references the charge and travel transactions for particular individuals within a corporate organization. For example, the system searches for hotel, car, rail, taxi/limo, ferry and certain restaurants/shops (such as those in airports). The system then further refines the query for international travel (e.g., ignores domestic transactions), and then identifies the specific location (i.e. geo-coding by merchant address information into a Google mapping feature).

The system may further refine the data by eliminating web-based transactions or recurring charges that are part of everyday spend, because such transactions do not appropriately indicate locations during travel away from the office (e.g., purchases at office supply stores near corporate headquarters). The system may also ignore non-business transactions, and/or domestic transactions. For example, the system may ignore a purchase transaction at Starbucks in New York if the employee works in New York; however, the system will include a purchase transaction by the same person at Starbucks in London.

In one embodiment, the system analyzes various transactions for an individual, then conducts a statistical analysis to determine the likelihood that various transactions related to a certain area should lead one to conclude that the consumer is now located in that specific area. In that regard, the system may provide a probability that the consumer is located in a first area and another probability that the consumer is located in a second area. For example, the system may determine that a charge card transaction showing a purchase of a visa for Brazil and a restaurant transaction showing a purchase of meal in Brazil indicates a 85% likelihood that the traveler is in Brazil. However, the system may determine that a charge card transaction showing a purchase of a train ticket in Austria on the previous day indicates that the traveler may have left or is leaving Austria via train, so the likelihood that the traveler is still in Austria is 20%.

The information may be consolidated into a report (as set forth herein) and/or provided to customers via a web based software application. The report may include individual name, higher risk employee designator, crisis location, distance from the crisis, time frame for entering a region near the crisis, if individual was already contacted, contact information and method for verifying location. The report may also allow the user to select which employees the user wishes to contact, and the order to contact the employees. The report may also include total number of travelers and/or employees impacted by the crisis, and if the impact from the crisis is extreme or high risk (e.g., based on a security assessment rating).

The report or application may be sent to, or available on, a personal digital assistant. The message may be generated using the client's internal mail provider. The web based interface may allow the employer to locate travelers using search criteria, such as type of traveler (e.g., employee, traveler, resident), risk-level, hotel, type of crisis (e.g., natural disaster, security, cultural, political, communication, health, transportation, entry/exit, finance, weather, environment, legal), time of crisis (e.g., past, present, future), passenger name record, date, region, length of time in a region, time frame for traveling to the region, associated group (e.g., group of travelers may be cross-referenced), business unit, booked individuals, or ticketed individuals. For example, the system may list all travelers from company A that are planning to stay at Marriott hotels in risk level 2 areas the next 2 days. The system may provide a search screen and/or online risk coded maps. The system may automatically e-mail travelers within seconds, without leaving the map interface, or provide a suggestion to the employer to email the employee. The system may send an alert or alternative travel arrangements (e.g., by e-mail) when travelers are impacted by an event, or when the number of employees on a flight exceeds a designated threshold. The system may provide analysis of the data discussed herein before or after the travel period (e.g., up to one year before travel and/or thirty days after travel). The system may also customize report formats and export data to Excel for analysis.

To assist in the analysis of the location of the employee, the report may also list transactions in chronological order. For example, the system may state that a plane crash occurred at 9:15 am, then list that the employee purchased a snack at an airport vendor at 9:26 am. Such information would quickly indicate that the employee did not board the ill-fated flight, and rather, the employee is still in the airport waiting for the next flight.

The system may also reconcile the travel information and transaction information to, for example, determine which transactions are associated with which travel itinerary items or reservations. Such reconciliation may also help determine the true location of a customer. In one embodiment, the system associates a monetary amount ("a second charge") with a non-monetary amount in order to determine which "first charge" that the "second charge" should be associated with. For example, the system associates a second charge (such as a $100 change fee incurred on Sep. 22, 2008) with first data (such as a Sep. 22, 2008 trip) located in a travel record in a travel database, based solely on the non-monetary data, namely the date data of Sep. 22, 2008 in order to determine that the $100 second charge should be associated with the Sep. 22, 2008 trip which previously incurred a $500 first charge. More specifically, the system enables data in a travel record to be matched with charge information in a financial database, wherein the charge information is not recorded in a travel record. The system also performs a first match based on a one-to-one matching of transactions (e.g., the ticket price as recorded in the travel record and the charge amount for purchasing the ticket). However, the system may go well beyond such one-to-one record matching by associating a second charge (which is not reflected in the travel record) with non-monetary data that is in the travel record, and assigning the second charge to a department code. The second charge (which is reflected in the charge record, but not reflected in the travel record) may include, for example, a fee/credit related to a change in the itinerary, an extra baggage fee at the airport, an upgrade fee, a downgrade credit, a travel agent fee and/or the like.

The method may involve providing account reconciliation for an account by matching a first charge in a financial database to a first amount of a travel record in a travel database, wherein a department code is associated with the travel record, and wherein the travel record in the travel database includes the first amount and first data, wherein the first data relates to non-monetary information; assigning the first charge in the financial database to the department code by writing the department code to a field corresponding to the first charge in the financial database; associating a second charge in the financial database with the first data of the travel record in the travel database, wherein the travel record in the travel database does not include the second charge in the financial database, and wherein the second charge in the financial database is associated with a change to the travel record in the travel database; and, assigning the second charge in the financial database to the department code associated with the travel record in the travel database. Other systems and methods related to account reconciliation may be incorporated into any of the embodiments discussed herein, such as the account reconciliation systems and methods are disclosed in U.S. Ser. No. 09/943,438 filed on Aug. 27, 2001 and entitled "System and Method for Account Reconciliation", which is hereby incorporated by reference in its entirety.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". When a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The detailed description of exemplary embodiments of the invention herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

The invention claimed is:

1. A computer-implemented method for notifying individuals impacted by a crisis, the method comprising:
   receiving, by a computer-based system comprising at least a computer processor, crisis information related to a crisis;
   determining, by the computer-based system, location information for each of a plurality of individuals, wherein the determining comprises cross-referencing travel information and financial transaction information for each of the individuals;
   determining, by the computer-based system, a subset of the individuals impacted by the crisis based on the location information, wherein the determination comprises:
      matching a first charge in a financial database to a first amount of a travel record in a travel database, and wherein the travel record in the travel database includes the first amount and first data, wherein the first data relates to non-monetary information;
      associating a second charge in the financial database with the first data of the travel record in the travel database, wherein the travel record in the travel database does not include the second charge in the financial database, wherein the second charge in the financial database is associated with a change to the travel record in the travel database, and wherein the first charge and the second charge are part of the financial transaction information, and wherein the travel record is part of the travel information;
      determining subset selection criteria associated with the crisis information, wherein the subset selection criteria indicates that an individual is impacted by the crisis;
      determining, based on the matched first charge, the associated second charge, and the determined selection criteria, a probability for each individual that the individual is impacted by the crisis; and
      selecting the subset of individuals determined to be impacted by the crisis based on the determined probability; and
   sending, by the computer-based system, a message to the subset of individuals.

2. The method of claim 1, further comprising notifying, by the computer-based system, a third party regarding the subset of individuals.

3. The method of claim 1, wherein the message includes alternative arrangements to at least one of minimize or avoid the crisis.

4. The method of claim 1, further comprising enabling, by the computer-based system, selection of a further subset of individuals using at least one of type of traveler, risk-level, hotel, type of crisis, time of crisis, passenger name record, date, region, length of time in a region, time frame for traveling to the region, associated group, business unit, booked individuals, or ticketed individuals.

5. The method of claim 1, wherein the subset of individuals are at least one of employees, travelers or residents.

6. The method of claim 1, further comprising providing, by the computer-based system, a report including at least one of individual name, crisis location, distance from the crisis, time frame for entering a region near the crisis, if individual was already contacted, contact information and method for verifying location.

7. The method of claim 1, further comprising graphically displaying, by the computer-based system, locations of the individuals.

8. The method of claim 1, further comprising providing, by the computer-based system, at least one of risk management, security briefings, weather information, visa information and alternative travel information to at least one of the individual or a third party.

9. The method of claim 1, wherein the travel information comprises at least one of: travel profile data, employee identifiers, names of travel companions, destinations, account numbers, e-mail addresses, passport information, global positioning system data, preferred rewards programs, and emergency contact information, computer reservation system (CRS) data, itinerary data, traveler profile, airline ticketing data, car rental data, hotel data, record locator, passenger name, flight number, flight carrier code, flight type, origination airport, depart date of trip, depart time of trip, destination airport, arrival date of trip, arrival time of trip, traveler email address, hotel chain code, hotel name, hotel address, hotel city, hotel state, hotel zip code, hotel country, hotel phone number, city code of airport, hotel check-in date, hotel check-out date, car domestic and international indicator, car vendor code, car vendor name, car pickup city code, car pickup city name, car pickup date and time, car drop-off date and time, statement information, car domestic and international indicator, user defined field, traveler cell or mobile phone number, traveler home phone number, traveler misc phone number, traveler agency phone number, travelers fax number, or identifier if passenger name record is ticketed.

10. The method of claim 1, wherein the financial transaction information comprises at least one of: charge account, debit account, corporate account, bank accounts, credit card accounts, card member details, approval or decline code, authorization date, authorization time, authorization type code, average request amount for previous 12 months, base account id, basic supplementary number, billing decline amount, billing currency code, billing decline amount in us dollars, date when the transaction was declined at the se, decline reason code, sequence number uniquely identifying each transaction on a given day, exposure amount in us dollars, currency code in iso, number of times the limit exceeded in a period, limit id, load timestamp, last updated timestamp, last updated user identifier, maximum requested amount for previous 12 months, priority number for the reason of decline, proposed limit amount for the previous 12 months, report period identifier, service establishment number, dba name, legal name, city name, street address, service establishment types, shops, hotels, restaurants, travel, check cashing, sight draft, check cashing, international, oil companies, department stores, mail order, cash dispensing, travelers check dispensing, car rental, restaurant transactions, taxi/limousine transactions, gasoline purchases, loyalty account data, gift card data, calling account data, club account data, entertainment account data, transportation data, global positioning system data or personal digital assistant data.

11. The method of claim 1, wherein the determining location information comprises determining a percent likelihood the individual is in each of a plurality of locations.

12. The method of claim 1, wherein the determining location information comprises cross-referencing the travel information and the financial transaction information to determine the location information of each of the individuals.

13. The method of claim 1, wherein the determining location information comprises eliminating at least one of web-based transactions, recurring charges, domestic transactions, or non-business transactions.

14. The method of claim 1, further comprising confirming, by the computer-based system, at least one of: the individual is following company guidelines, the individual is spending company funds, the manner in which various sales representatives are distributed throughout a region, the individual is attending certain functions, the individual is not working outside of her territory, and the individual is not near particular people or groups.

15. The method of claim 1, further comprising: assigning, by the computer-based system, the first charge in the financial database to a department code by writing the department code to a field corresponding to the first charge in the financial database, wherein a department code is associated with the travel record; and assigning, by the computer-based system, the second charge in the financial database to the department code associated with the travel record in the travel database.

16. The method of claim 6, further comprising: receiving, by the computer-based system, a request for the report, wherein the request includes data selection criteria comprising a corporate transaction account provider identifier, an air sector, and a fare basis code, and wherein the transaction processor is a host computer; parsing the request to retrieve the data selection criteria from a natural language query in response to the request including the natural language query, wherein the data selection criteria includes metadata; receiving a categorized view instruction, wherein the categorized view instruction determines a data placement and format for the report; formatting the data selection criteria in accordance with the metadata, wherein the plurality of disparate travel sources comprise at least one of: a Customer Reservations System (CRS) and an air carrier which store the travel transaction data including travel cost data; and wherein the plurality of disparate financial sources comprise financial account providers which store the financial transaction account data including financial charge data; retrieving the financial transaction account data, including the financial charge data, from at least one of the plurality of disparate financial sources in accordance with the data selection criteria; retrieving the travel transaction data from at least one of the plurality of disparate travel sources in accordance with the data selection criteria, wherein the travel transaction data includes the travel cost data, the air sectors, and the fare basis codes provided by the air carrier and, wherein the travel transaction data is obtained by the transaction processor; adding proprietary information to the financial transaction account data and the travel transaction data, wherein the proprietary information relates to a host supplier network; adding to the report, line item detail including the financial charge data from the financial transaction account data and from the travel transaction data; positioning each of the data elements in accordance with the categorized view instruction, wherein the data elements are marked as billed or unbilled; conditioning the data elements to transform the data elements into the report for transmission to a client; converting the financial transaction account data and the transaction data from the disparate travel sources and the disparate financial sources into a single format; and sending the report to a client.

17. The method of claim 16, wherein the metadata comprises at least one of: (i) instructions for where to access travel transaction data, (ii) instructions for where to access financial account data, (iii) instructions for how to access the travel transaction data, (iv) instructions for how to access the financial account data, (v) instructions for retrieving travel transaction data, (vi) instructions for retrieving financial account data, (vii) protocols that are used to access the travel transaction data, (viii) protocols that are used to access the financial account data, (ix) a location identifier corresponding to a plurality of disparate travel sources, (x) protocol instructions for the plurality of disparate travel sources, (xi) a location identifier corresponding to a plurality of disparate financial sources, (xii) protocol instructions for the plurality of disparate financial sources, and (xiii) a defined relationship between attributes and metrics of the natural language query and target data sources.

18. An article of manufacture including a non-transitory, tangible computer-readable storage medium having instructions stored thereon that, in response to execution by a computer-based system for notifying individuals impacted by a crisis, cause the computer-based system to perform operations comprising:

receiving, by the computer-based system, crisis information related to a crisis;

determining, by the computer-based system, location information for each of a plurality of individuals, wherein the determining comprises cross-referencing travel information and financial transaction information for each of the individuals;

determining, by the computer-based system, a subset of the individuals impacted by the crisis based on the location information, wherein the determination comprises:

matching a first charge in a financial database to a first amount of a travel record in a travel database, and wherein the travel record in the travel database includes the first amount and first data, wherein the first data relates to non-monetary information;

associating a second charge in the financial database with the first data of the travel record in the travel database, wherein the travel record in the travel database does not include the second charge in the financial database, wherein the second charge in the financial database is associated with a change to the travel record in the travel database, and wherein the first charge and the second charge are part of the financial transaction information, and wherein the travel record is part of the travel information;

determining subset selection criteria associated with the crisis information, wherein the subset selection criteria indicates that an individual is impacted by the crisis;

determining, based on the matched first charge, the associated second charge, and the determined selection criteria, a probability for each individual that the individual is impacted by the crisis; and selecting the subset of individuals determined to be impacted by the crisis based on the determined probability; and sending, by the computer-based system, a message to the subset of individuals.

19. A system comprising:

a processor for notifying individuals impacted by a crisis, a tangible, non-transitory memory configured to communicate with the processor, the tangible, non-transitory memory having instructions stored thereon that, in response to execution by the processor, cause the processor to perform operations comprising:

receiving, by the processor, crisis information related to a crisis;

determining, by the processor, location information for each of a plurality of individuals, wherein the determining comprises cross-referencing travel information and financial transaction information for each of the individuals;

determining, by the processor, a subset of the individuals impacted by the crisis based on the location information, wherein the determination comprises:

matching a first charge in a financial database to a first amount of a travel record in a travel database, and wherein the travel record in the travel database includes the first amount and first data, wherein the first data relates to non-monetary information;

associating a second charge in the financial database with the first data of the travel record in the travel database, wherein the travel record in the travel database does not include the second charge in the financial database, wherein the second charge in the financial database is associated with a change to the travel record in the travel database, and wherein the first charge and the second charge are part of the financial transaction information, and wherein the travel record is part of the travel information;

determining subset selection criteria associated with the crisis information, wherein the subset selection criteria indicates that an individual is impacted by the crisis;

determining, based on the matched first charge, the associated second charge, and the determined selection criteria, a probability for each individual that the individual is impacted by the crisis; and selecting the subset of individuals determined to be impacted by the crisis based on the determined probability; and sending, by the computer-based system, a message to the subset of individuals.

* * * * *